(12) United States Patent
Kazyak et al.

(10) Patent No.: US 8,029,063 B2
(45) Date of Patent: Oct. 4, 2011

(54) VEHICLE SEAT TRACK

(75) Inventors: David A. Kazyak, Brighton, MI (US); Michael J. Leighton, LaSalle (CA); William S. Brewer, Plymouth, MI (US); Simon Moore, Brighton, MI (US); Todd M. Tommelein, Saline, MI (US)

(73) Assignee: Johnson Controls Technology Company, Holland, MI (US)

( * ) Notice: Subject to any disclaimer, the term of this patent is extended or adjusted under 35 U.S.C. 154(b) by 241 days.

(21) Appl. No.: 12/293,885

(22) PCT Filed: Mar. 23, 2007

(86) PCT No.: PCT/US2007/007385
§ 371 (c)(1),
(2), (4) Date: Mar. 10, 2009

(87) PCT Pub. No.: WO2007/112071
PCT Pub. Date: Oct. 4, 2007

(65) Prior Publication Data
US 2009/0322136 A1    Dec. 31, 2009

Related U.S. Application Data

(60) Provisional application No. 60/785,907, filed on Mar. 24, 2006.

(51) Int. Cl.
*A47C 1/00* (2006.01)
(52) U.S. Cl. .............. 297/344.1; 297/344.11; 248/430; 248/429

(58) Field of Classification Search ............... 297/344.1, 297/344.11; 248/429, 430
See application file for complete search history.

(56) References Cited

U.S. PATENT DOCUMENTS

| | | | | |
|---|---|---|---|---|
| 4,262,963 A * | 4/1981 | Bauer et al. | ............ | 297/473 |
| 4,720,072 A * | 1/1988 | Kitano et al. | ............ | 248/429 |
| 5,370,350 A * | 12/1994 | Okano et al. | ............ | 248/430 |
| 6,098,946 A * | 8/2000 | Sechet et al. | ............ | 248/424 |
| 6,176,460 B1 * | 1/2001 | Kojima et al. | ............ | 248/429 |
| 6,354,553 B1 | 3/2002 | Lagerweij et al. | | |
| 6,427,962 B1 * | 8/2002 | Rohee et al. | ............ | 248/424 |
| 6,637,712 B1 * | 10/2003 | Lagerweij | ............ | 248/429 |
| 6,669,284 B2 * | 12/2003 | Feichtinger et al. | ..... | 297/216.18 |
| 7,204,467 B2 * | 4/2007 | Strubel et al. | ............ | 248/429 |
| 2003/0006355 A1 * | 1/2003 | Horsfield et al. | ............ | 248/429 |
| 2004/0222347 A1 | 11/2004 | Oh | | |
| 2004/0238712 A1 | 12/2004 | Oh | | |

FOREIGN PATENT DOCUMENTS

| | | |
|---|---|---|
| DE | 3616571 A1 | 11/1986 |
| DE | 4242895 CI | 11/1993 |
| WO | 03013901 A | 2/2003 |

* cited by examiner

*Primary Examiner* — Laurie Cranmer
(74) *Attorney, Agent, or Firm* — Butzel Long

(57) ABSTRACT

A track assembly for a vehicle seat includes a first track member and a reinforcing member. The first track member has a first portion defining a first set of apertures configured to receive a locking device. The reinforcing member, which may be in the form of a plate, is coupled to the first portion and defines a second set of apertures corresponding to the first set of apertures. The second set of apertures are also configured to receive the locking device. The reinforcing member is configured to reinforce the first track member in an area around and between the first set of apertures.

24 Claims, 10 Drawing Sheets

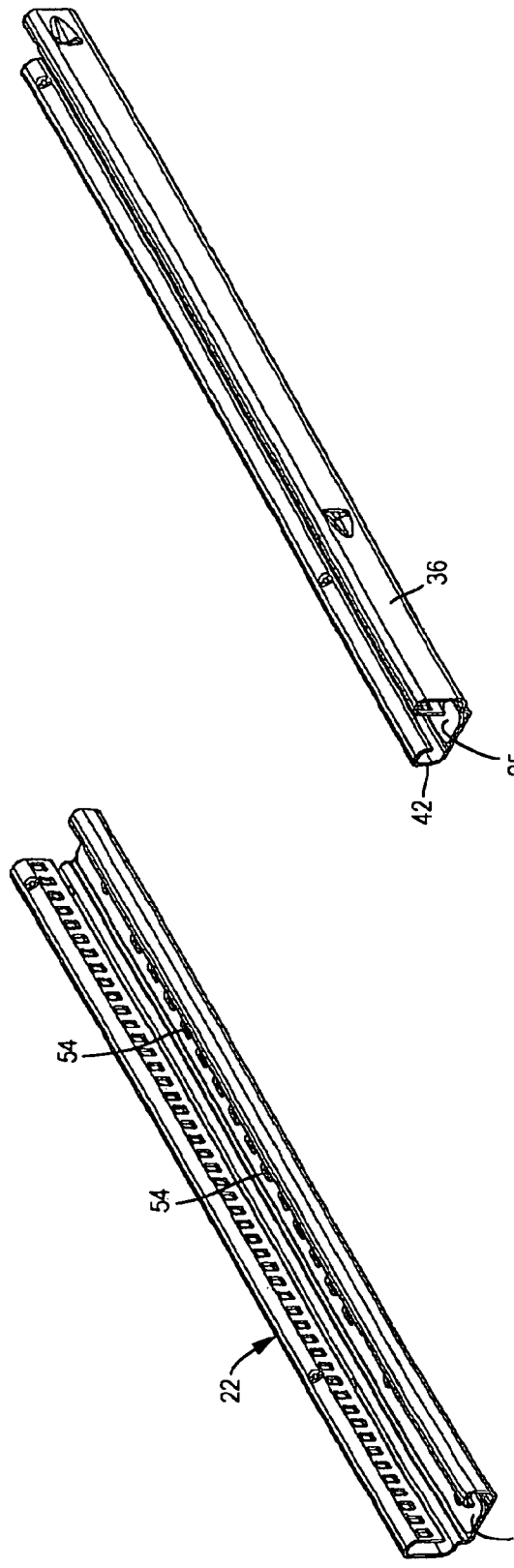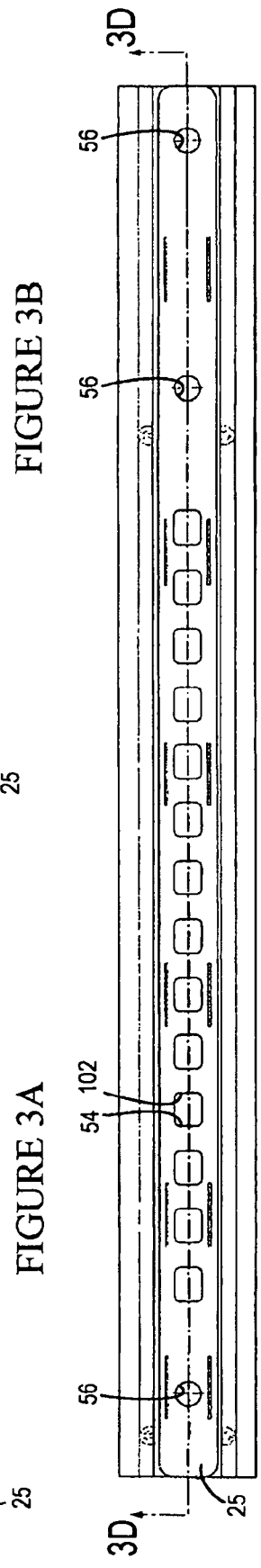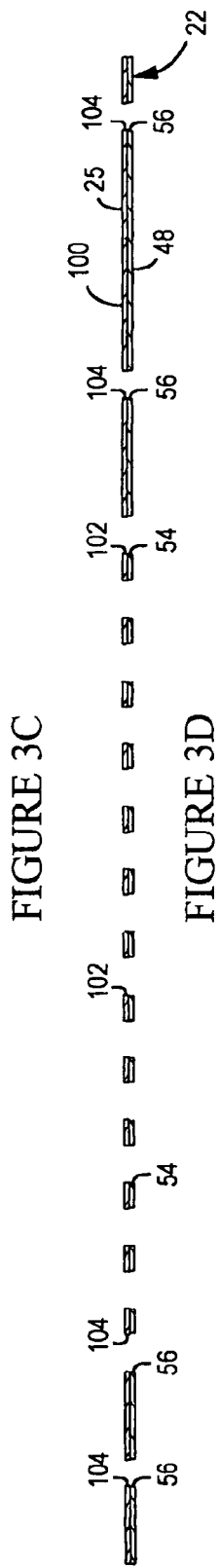
FIGURE 3A
FIGURE 3B
FIGURE 3C
FIGURE 3D

VEHICLE SEAT TRACK

CROSS-REFERENCE TO RELATED PATENT APPLICATIONS

The present application claims the benefit of priority from U.S. Provisional Patent Application No. 60/785,907, filed Mar. 24, 2006, the entire disclosure of which is incorporated by reference herein.

The present application is related to U.S. Provisional Patent Application No. 60/627,429, filed Nov. 12, 2004; PCT Application No. PCT/US2005/040779, filed Nov. 10, 2005; U.S. Provisional Patent Application No. 60/649,397, filed Feb. 2, 2005; and PCT Application No. PCT/US2006/003468, filed Feb. 1, 2006, each of which is incorporated by reference herein.

BACKGROUND

The present disclosure relates generally to the field of adjustable vehicle seat assemblies. More particularly, the present disclosure relates to the field of track systems or arrangements for use with adjustable vehicle seat assemblies.

Vehicle seat assemblies are typically provided with a track system that enables the position of the seat assembly within a motor vehicle to be adjusted in the forward and rearward direction. Such adjustment capability is desirable to enable vehicle operators of various sizes to be seated comfortably and safely within the motor vehicle. Such seat assemblies commonly include two track members (but may have more) that move relative to one another and a latching mechanism that releasably retains the track members (and therefore the seat assembly) in a locked position relative to one another until the latch mechanism is released. Once the latch mechanism is released, the track members can be moved relative to one another, which allows the occupant of the seat assembly to adjust the position of the seat assembly and to then reengage or release the latching mechanism to hold the seat in the new location.

Latch mechanisms typically retain the seat assembly in a particular position by inserting one or more pins through apertures and/or slots that are provided in or on the track members that make up the track system, which has the effect of locking the track members in position with respect to one another. To unlock the tracks and allow the occupant of a seat to adjust the position of the seat, the one or more pins are removed from the apertures and/or slots. The strength of the lock between the tracks is generally limited by the strength of the pins and the strength of the track that receives the pins.

The track members will have a limiting portion or area that serves as the limiting factor of the track with respect to its strength. For example, the limiting portion of many tracks is the area around the apertures that receive the pins. When the seat is subjected to a load, the pins tend to cause this area to deform or deflect. In order to meet certain strength requirements, manufacturers often use a track having a uniform wall thickness and choose the wall thickness based on what is needed to allow the limiting portion or area of the track to satisfy the strength requirements. Similarly, when adapting a particular track design for use in an application having a greater strength requirement, manufacturers often increase the thickness of the material used to form the track to the extent needed to allow the limiting portion or area of the track to satisfy the greater strength requirement.

Although increasing the thickness of the material used to form the track generally provides the track with the desired strength, the additional strength often comes at the expense of significant additional weight, a potentially larger cross-sectional area of the track, additional development, testing, and design, additional tooling, and additional cost. Moreover, the increased wall thickness may also require the use of different or redesigned components (e.g. a different size of ball bearings used between the sliding tracks, etc.) to account for the increased thickness of the track.

To provide a more reliable, more widely acceptable seat track system or arrangement that is adaptable to meet different strength requirements, which avoids one or more of the above-referenced and other problems would represent a significant advance in the art.

SUMMARY

An exemplary embodiment relates to a track assembly for a vehicle seat. The track assembly includes a first track member and a reinforcing member. The first track member has a first portion defining a first set of apertures configured to receive a locking device. The reinforcing member, which may be in the form of a plate, is aligned with the first set of apertures and, in particular, may be coupled to the first portion. The reinforcing member defines a second set of apertures corresponding to the first set of apertures. The second set of apertures are also configured to receive the locking device. The reinforcing member reinforces the first track member in an area around and between the first set of apertures.

Another exemplary embodiment relates to a vehicle seat assembly. The vehicle seat assembly includes a seat and a track assembly. The seat has a back portion and seat base. The track assembly supports at least the seat base. The track assembly includes a first track member defining a first aperture, a reinforcing member coupled to the first track member and defining a second aperture corresponding to the first aperture, a second track member coupled to the first track member, and a vertically aligned lock device for preventing the movement of one of the first track member and the second track member relative to the other one of the first track member and the second track member. The lock device includes at least one pin configured to lock the track assembly by selectively engaging the first aperture and the second aperture. The plate reinforces the first track member in an area adjacent to the first set of apertures.

Another exemplary embodiment relates to a method of manufacturing a seat track. The method includes the steps of providing a first track member having a first portion defining a first set of apertures configured to receive a locking device, providing a reinforcing member defining a second set of apertures corresponding to the first set of apertures and configured to receive the locking device, and attaching the reinforcing member to the first portion so that the second set of apertures substantially align with the first set of apertures. The reinforcing member reinforces the first track member in an area around and between the first set of apertures.

Another exemplary embodiment relates to a track arrangement that includes a lower track member configured to be coupled to the vehicle, an upper track member that couples to the lower track member in a manner that allows the upper track (and a seat that is coupled to the upper track) to move relative to the lower track, and a reinforcing member that is coupled to the bottom of the lower track.

Another exemplary embodiment relates to a latch assembly that is coupled to the upper track member and includes at least one pin that engages corresponding apertures provided in the lower track member and the reinforcing member. The apertures in the lower track member and reinforcing member correspond with one another and are intermittently spaced along the length of a portion of the lower track member aligned substantially vertically with the upper track member. When the position of the upper track member is locked with respect to the lower track member, the at least one pin of the latch assembly extends through the corresponding apertures in the lower track member and reinforcing member. The reinforcing member is intended to reinforce the lower track member in the area around and between the apertures of the lower track member to strengthen this area. A lever assembly is operatively coupled to the latch assembly and is configured to release the latch assembly and allow the upper track member to move relative to the lower track member when the occupant of the seat to which the upper track member is coupled actuates the lever assembly.

The size, shape, configuration, and other characteristics of the different components of the track arrangement may be varied to give the track arrangement any one or more of a variety of different characteristics suitable for a particular application. For example, the thickness of the plate mate be varied depending on the strength requirement of the track system. The features of the track arrangement may allow the track arrangement to be adapted for use with different applications having different strength requirements. These features may also make it possible to produce a track arrangement that may be used with a variety of different types of latch mechanisms. Other ways in which the various features of the present invention can be accomplished will be described later herein, and still others will appear to those skilled in the art after they have read this specification. Such other ways are deemed to fall within the scope of the present invention, if they fall within the scope of the appended claims.

BRIEF DESCRIPTION OF THE DRAWINGS

FIGS. 3A through 3D are perspective and plan views of a lower track member of the track arrangement of FIG. 2 shown coupled to a reinforcing member according to one exemplary embodiment.

DETAILED DESCRIPTION

Before providing the description of the exemplary and alternative embodiments of the track systems, it should be noted that references to "outer," "inner," "intermediate," "above," "below," "upper," "lower," "left," or "right" in this description are merely used to identify the various elements as they are oriented in the figures or as they may be oriented in one or more particular embodiments of the track system. These terms are not meant to limit the element which they describe, as the various elements may be oriented or arranged differently in various track systems.

Figure 1:
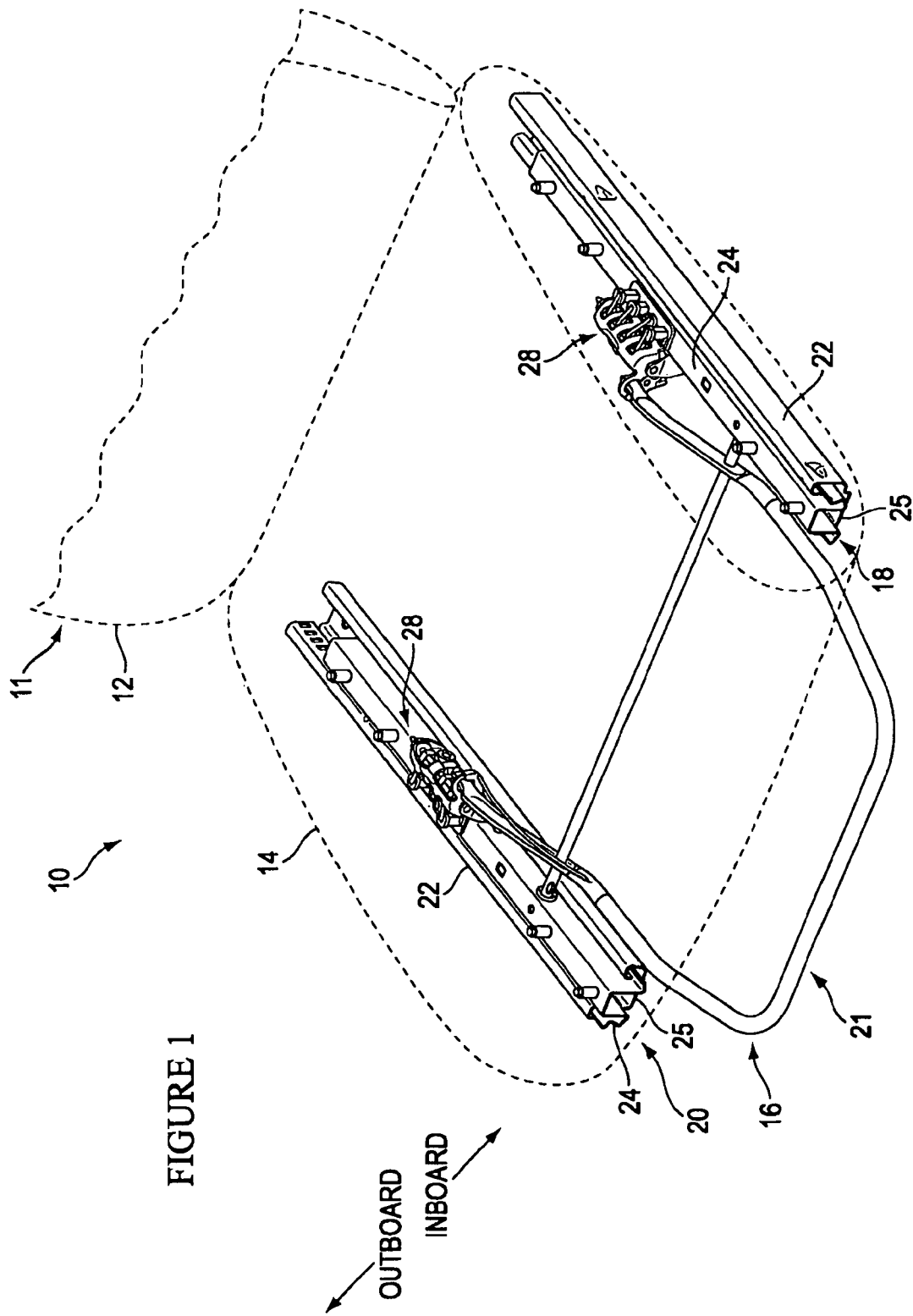
FIG. 1 is a perspective view of a seat assembly including a track system according to one exemplary embodiment.

Referring now to FIG. 1, a seat assembly 10 is shown according to one exemplary embodiment. Seat assembly 10 includes a seat 11 and a track system 16. Seat 11 generally includes a back portion 12 and a seat cushion or base portion 14, each of which may take any one of a variety of well known configurations. Track system 16 is generally configured to enable an occupant of seat 11 to adjust the position of seat 11 in at least a longitudinal (e.g., forward and rearward) direction.

Track system 16 includes an inboard track arrangement 18, an outboard track arrangement 20, and a lever assembly 21. Inboard track arrangement 18 and outboard track arrangement 20 are coupled to seat cushion portion 14 of seat 11 in a generally spaced-apart and parallel relationship, with inboard track arrangement 18 being located proximate the inboard side of seat cushion portion 14 and outboard track arrangement 20 being located proximate the outboard side of seat cushion portion 14. Lever assembly 21 is generally located between inboard track arrangement 18 and outboard track arrangement 20 in a location that allows an occupant of seat 11 to actuate lever assembly 21. Track arrangements 18 and 20 and lever assembly 21 are configured to cooperate together to allow for the movement or translation of seat 11 relative to the general structure to which seat 11 is coupled, such as the floor of a automobile, when the occupant of seat 11 actuates lever assembly 21.

Track arrangement 20 is generally identical to track arrangement 18, except that track arrangement 20 is a mirror image of track arrangement 18. Accordingly, the same reference numbers will be used to refer to like components of track arrangement 20 and track arrangement 18. For simplicity, only track arrangement 18 will be described below, it being understood that the description applies equally to track arrangement 20. Track arrangement 18 includes a lower track 22, an upper track 24, a plate 25, and a latch assembly 28.

Referring particularly now to FIGS. 2 and 3A-3D, lower track 22 (e.g., track, rail, slide, guide, etc.) is an elongated and generally rigid track member that is configured to be coupled to a structure, such as the floorboard of an automobile, and to generally serve as a guide for upper track 24. According to one exemplary embodiment, lower track 22 is an asymmetrical track member that includes an outer channel 30, an inner channel 32, and an intermediate channel 34. It should be noted that the terms "outer" and "inner" as used in connection with the upper and lower tracks are intended to refer to the relative position of the particular component or feature of the tracks relative to the center of the seat to which the tracks are coupled.

Figure 2:
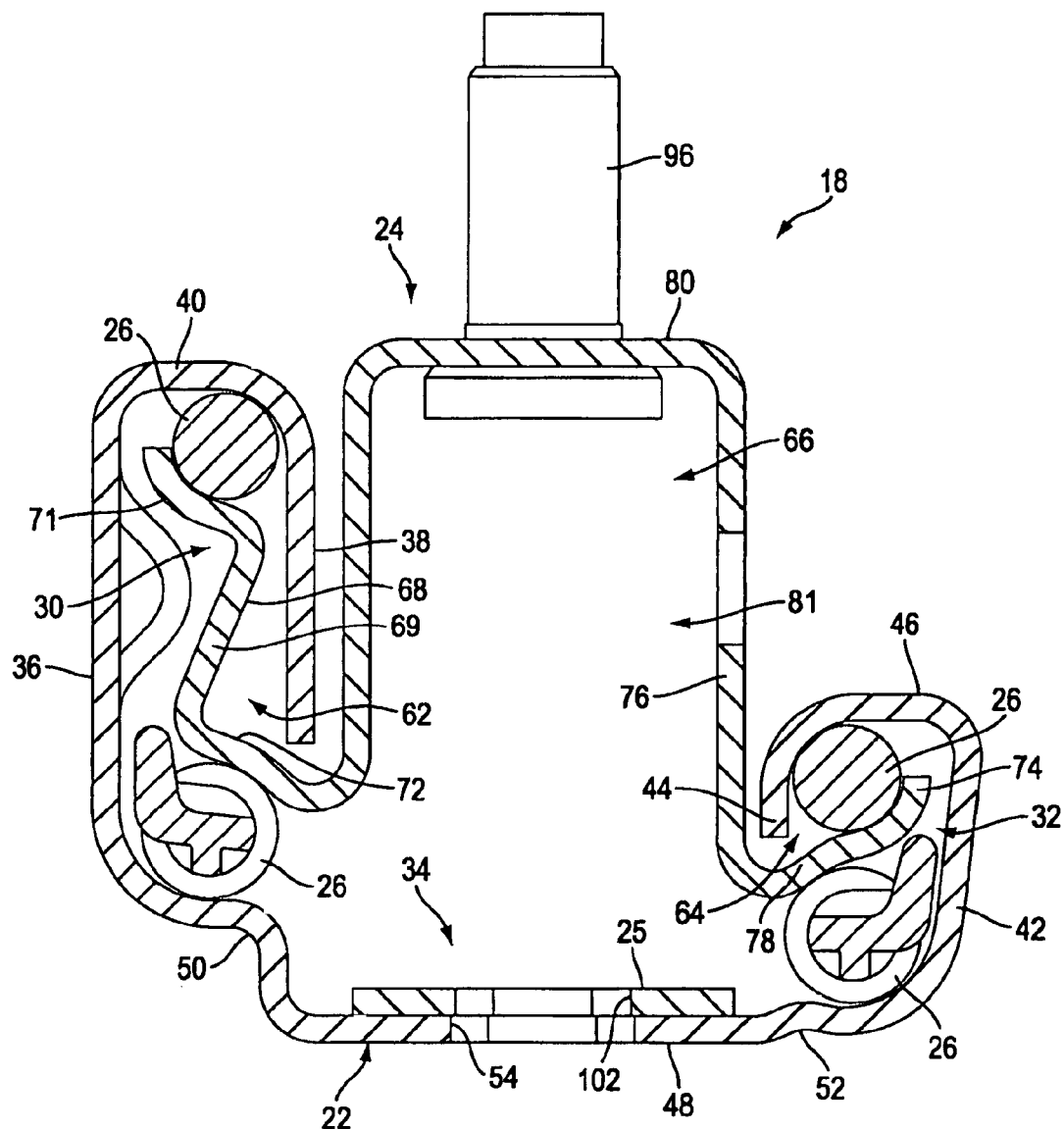
FIG. 2 is a cross-sectional view of a track arrangement of the track system of FIG. 1.

As best shown in FIG. 2, outer channel 30 is a generally U-shaped channel that faces downwardly. Outer channel 30 is formed by two generally vertical sidewalls 36 and 38 (the two legs of the "U") that are joined together by a generally horizontal intermediate wall 40 (the base of the "U"). The location of intermediate wall 40 above the base of lower track 22 defines the height of channel 30.

Similarly, inner channel 32 is a generally U-shaped channel that faces downwardly. Inner channel 32 is formed by two generally vertical sidewalls 42 and 44 (the two legs of the "U") that are joined together by a generally horizontal intermediate wall 46 (the base of the "U"). The location of intermediate wall 46 above the base of lower track 22 defines the height of channel 32, which is roughly half the height of channel 30.

Intermediate channel 34 is a generally upwardly facing, U-shaped channel (with one leg being longer than the other) that is formed by sidewall 38 of channel 30 (the longer leg of the "U"), sidewall 44 of channel 32 (the shorter leg of the "U"), and a generally horizontal intermediate wall or base 48 (the base of the "U") that extends between, and couples to, sidewall 36 of channel 30 and sidewall 42 of channel 32.

Figure 8:
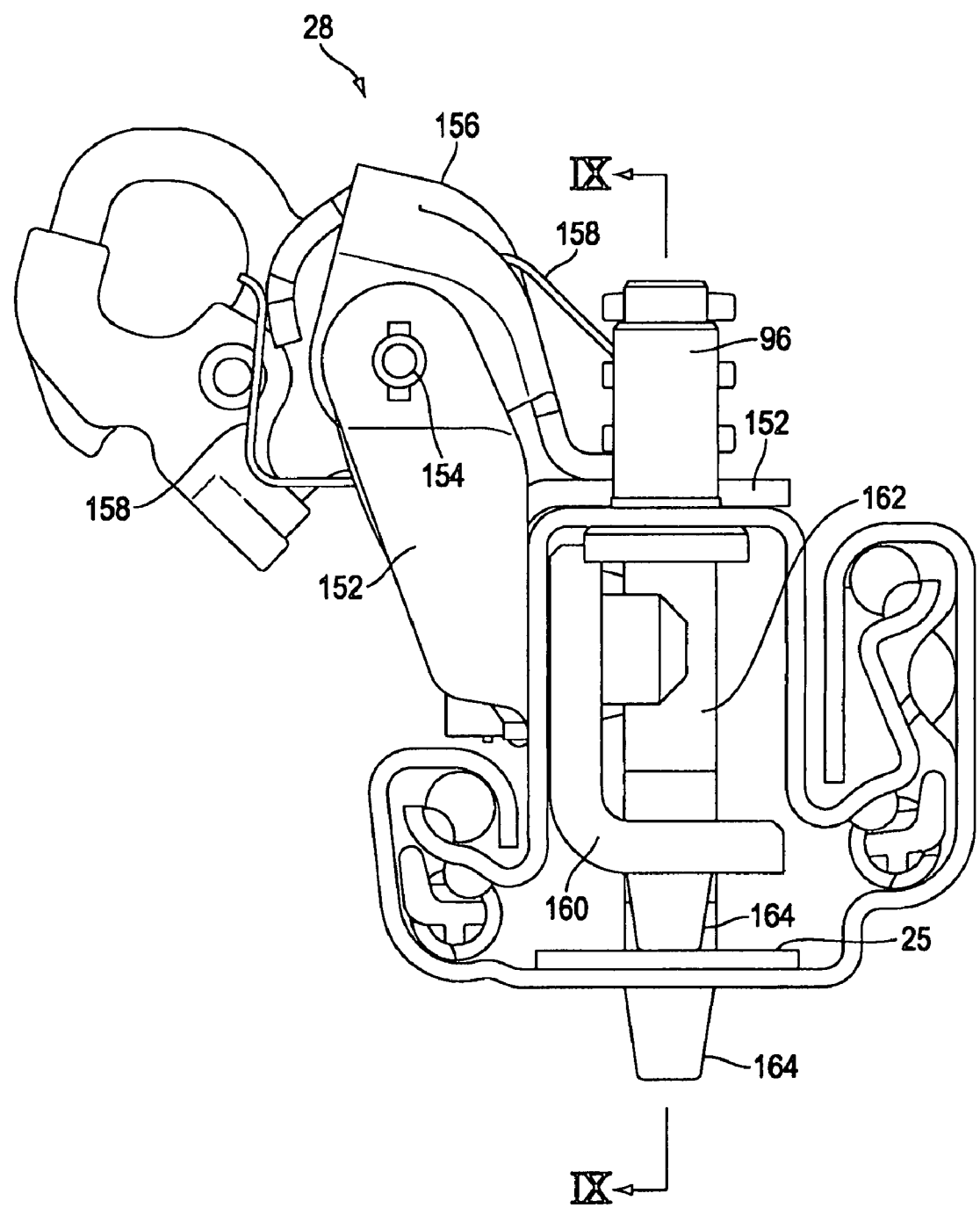
FIG. 8 is an end view of one of the track arrangements of FIG. 1.

Referring now to FIGS. 3A through 3D, base 48 of channel 34 includes a series of apertures 54 (e.g., latch windows, openings, holes, slots, etc.) that are uniformly spaced along a portion of the length of lower track 22. Apertures 54 are generally configured to receive a portion of latch assembly 28 and to thereby retain latch assembly 28 (and upper track 24) in its position relative to lower track 22 until the latch assembly is released (e.g., until the portion of latch assembly 28 received within one or more of apertures 54 is removed from apertures 54). The shape, size, spacing, and other characteristics of apertures 54 may vary, depending at least in part on the type of latching assembly that is used in track arrangement 18. According to one exemplary embodiment illustrated in FIG. 3C, apertures 54 are generally rectangular openings that are relatively closely spaced and that are surrounded on all sides by the material of lower track 22. Such a configuration of apertures is generally suited for use with a positive engagement-type latch, such as the one illustrated in FIGS. 1, 8, and 9. According to various exemplary and alternative embodiments, the apertures in the lower track may take one or more of a variety of different shapes, sizes, and configurations depending on the characteristics of the latch mechanism that is configured to engage the apertures. For example, according to one exemplary embodiment, the apertures may be shaped, sized, spaced, and otherwise configured for use with the pawl-type latch.

Referring still to FIGS. 3A through 3D, intermediate wall or base 48 of lower track 22 also includes apertures 56, which may be configured to receive one of a variety of different coupling members, fasteners, and/or structures (e.g., pins, studs, rivets, dowels, bolts, etc.) that may be used to couple lower track 22 to the floor of an automobile (or one of a variety of other structures). One example of such a coupling member is pin or stud which extends through aperture 56 (and through plate 25) and which is configured to couple to the floor of an automobile. According to various alternative and exemplary embodiments, the apertures in the base of the lower track may vary in number, size, shape, and configuration in order to allow the lower track to be coupled to one or more of a variety of different structures using one or more of a variety of different structures.

Figure 4:
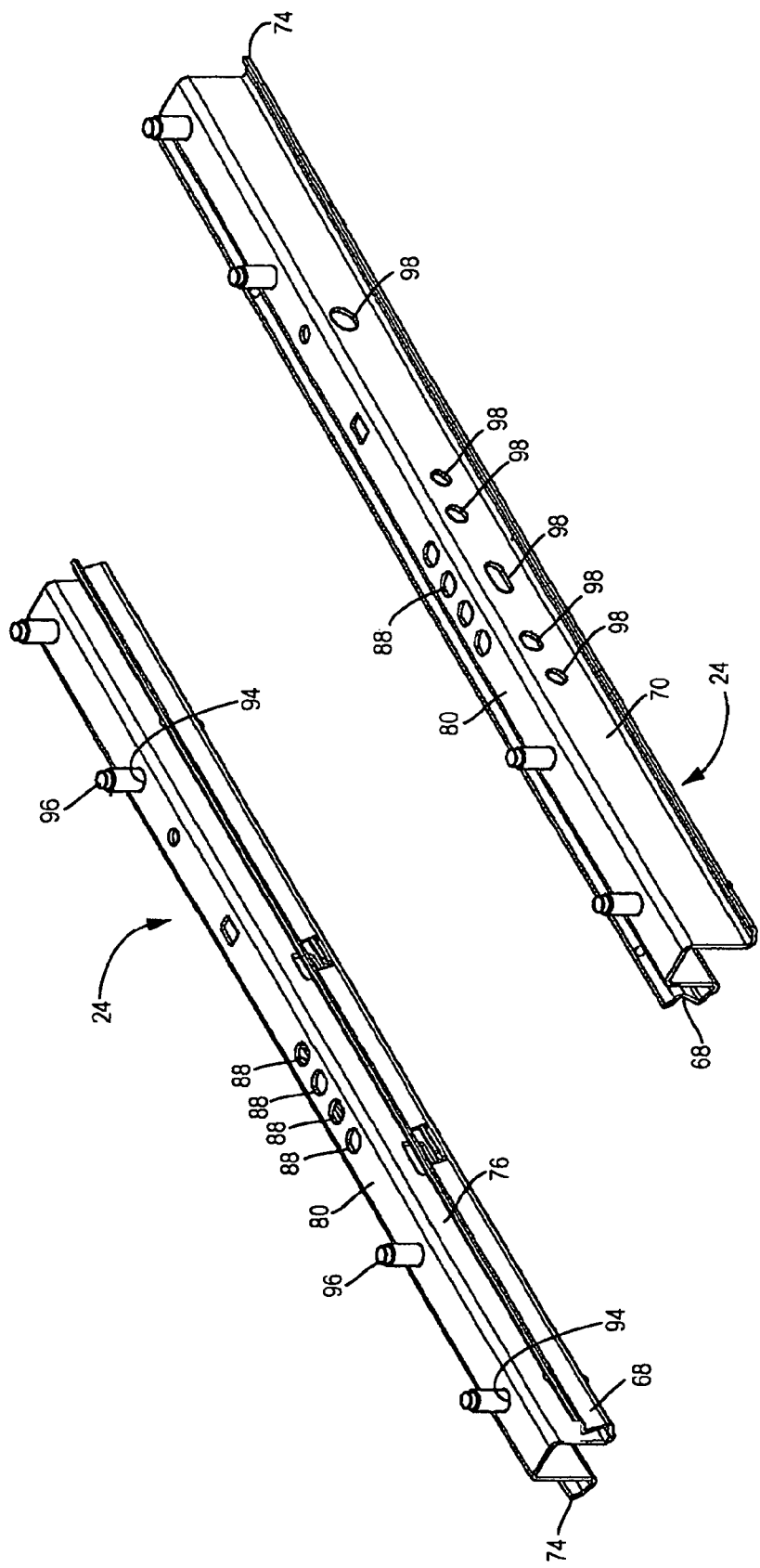
FIG. 4 is a perspective view of a pair of upper track members of the track system of FIG. 1.

Referring now to FIGS. 2 and 4, upper track 24 (e.g., track, rail, slide, etc.) is an elongated and generally rigid member that is configured to be coupled to lower track 22 in a manner that allows upper track 24 to move (e.g., translate or slide) relative to lower track 22. According to one exemplary embodiment, upper track 24 is an asymmetrical track that includes an outer channel 62, an inner channel 64, and an intermediate channel 66.

Outer channel 62 is a roughly U-shaped channel that faces upwardly. Outer channel 62 is formed by a generally bent sidewall 68 and a generally vertical sidewall 70 (the two legs of the "U") that are joined together by an intermediate wall 72 (the base of the "U") that inclines upwardly as it extends from sidewall 70 to sidewall 68. The generally bent sidewall 68 includes a lower portion 69 that extends upwardly and inwardly (toward sidewall 70) and an upper portion 71 that extends upwardly and outwardly (away from sidewall 70).

Inner channel 64 is a roughly U-shaped, relatively shallow channel (with one leg of the "U" being much longer than the other) that faces upwardly. Inner channel 64 is formed by two generally vertical sidewalls 74 and 76 (the two legs of the "U") that are joined together by an intermediate wall 78 (the base of the "U") that inclines upwardly as it extends from sidewall 76 to sidewall 74. Sidewall 74 is much shorter than sidewall 76 and extends to a height that is much less than the height to which sidewall 76 extends.

Intermediate channel 66 is a generally downwardly facing, U-shaped channel (with one leg being longer than the other) that is formed by sidewall 70 of channel 62 (the shorter leg of the "U"), sidewall 76 of channel 64 (the longer leg of the "U"), and a generally horizontal intermediate wall or top 80 (the base of the "U") that extends between, and couples to, sidewall 70 of channel 62 and sidewall 76 of channel 64.

According to one exemplary embodiment illustrated in FIG. 4, upper track 24 includes a series of four generally oval apertures 88 (e.g., latch windows, openings, holes, etc.) in top 80 that are configured to cooperate with a positive engagement-type latch assembly, such as the one illustrated in FIGS. 1 and 8 through 14. Apertures 88 are configured to allow a portion of latch assembly 28 to extend through top 80 and releasably engage one or more of apertures 54 in lower track 22 (and/or one or more apertures provided in plate 25). Each of apertures 88 corresponds to an aperture 54 in lower track 22.

As shown in FIG. 4, intermediate wall or top 80 of upper track 24 may include apertures 94, which are configured to receive one of a variety of different coupling members, fasteners, and/or structures (e.g., pins, studs, rivets, dowels, bolts, etc.) that may be used to couple upper track 24 to a portion of seat 11 (or to a variety of other structures or brackets). One example of such a coupling member is pin or stud 96 which extends through aperture 94 and which is configured to couple to the frame or other portion of seat 11. According to various alternative and exemplary embodiments, the apertures in the top of the upper track may vary in number, size, shape, and configuration in order to allow the upper track to be coupled to one or more of a variety of different seat configurations or other structures.

Referring still to FIG. 4, sidewall 70 of upper track 24 may include apertures 98, which are configured to receive one of a variety of different coupling members, fasteners, or structures (e.g., pins, studs, rivets, dowels, bolts, etc.) that may be used to couple latch assembly 28 (or a portion of latch assembly 28) to upper track 24, or that may be used to couple other components to upper track 24. Sidewall 70 of upper track 24 may also include an aperture 99 that is configured to receive a portion of lever assembly 21. According to various alternative and exemplary embodiments, the different apertures in the sidewall of the upper track may vary in number, size, shape, and configuration in order to allow one or more of a variety of different latch assemblies, lever assemblies, or other components or structures to be coupled to the upper track.

As best shown in FIG. 2, lower track 22 and upper track 24 are coupled together in a manner that allows upper track 24 to translate relative to lower track 22. In this coupled condition, sidewall 68 of upper track 24 extends upwardly into channel 30 of lower track 22, and sidewall 74 of upper track 24 extends generally upwardly into channel 32 of lower track 22. At the same time, sidewall 38 of lower track 22 extends into channel 62 of upper track 24, and sidewall 44 of lower track 22 extends into channel 64 of upper track 24. In other words, outer channel 30 of lower track 22 interlocks or engages outer channel 62 of upper track 24, and inner channel 32 of lower track 22 interlocks or engages inner channel 64 of upper track 24. Intermediate channel 34 of lower track 22 is generally aligned with intermediate channel 66 of upper track 24 to define an internal volume or chamber 81 between upper track 24 and lower track 22. Friction reducing members 26 (e.g., bearings, bushings, etc.) are provided between various portions of upper track 24 and lower track 22 to maintain the alignment of upper track 24 and lower track 22 and to facilitate the translational movement of upper track 24 relative to lower track 22.

In the coupled condition illustrated in FIG. 2, intermediate channel 66 of upper track 24 is bordered on its left by outer channel 30 of lower track 22 and on its right by inner channel 32 of lower track 22. The height of outer channel 30 of lower track 22 (e.g., the distance that intermediate wall 40 lies above base 48) is approximately equal to the height of intermediate channel 66 of upper track 24 (e.g. the distance that top 80 of upper track 24 lies above base 48 of lower track 22). The height of inner channel 32 of lower track 22 (e.g., the distance that intermediate wall 46 lies above base 48), on the other hand, is less than the height of intermediate channel 66 of upper track 24. According to various exemplary and alternative embodiments, the height of inner channel 32 of lower track 22 is roughly half of, or a third of, the height of intermediate channel 66 of upper track 24. Accordingly, a portion of sidewall 76 of intermediate channel 66 extends above the top of channel 32 (e.g., extends above intermediate wall 46) by a distance D. The portion of sidewall 76 that extends above the top of channel 32 by a distance D provides an area or surface to which a latch assembly 28 (described below) may be coupled and allows at least a portion of latch assembly 28 to extend substantially horizontally from sidewall 76.

According to other various alternative and exemplary embodiments, the size, shape, and configurations of the upper track and the lower track may vary depending on one or more of a plurality of different factors, including the application in which the tracks will be used, the environment in which the tracks will be used, the size of the friction reducing members (e.g., bearings) used between the upper track and the lower track, the particular latch assembly with which the tracks will be used, cost considerations, manufacturing considerations, etc. For example, according to various alternative and exemplary embodiments, the height of the outer channel of the lower track may be higher or lower than the height of the intermediate channel of the upper track, and/or the height of the inner channel of the lower track may be greater than or less than roughly half the height of the intermediate channel of the upper track.

Figure 5A:
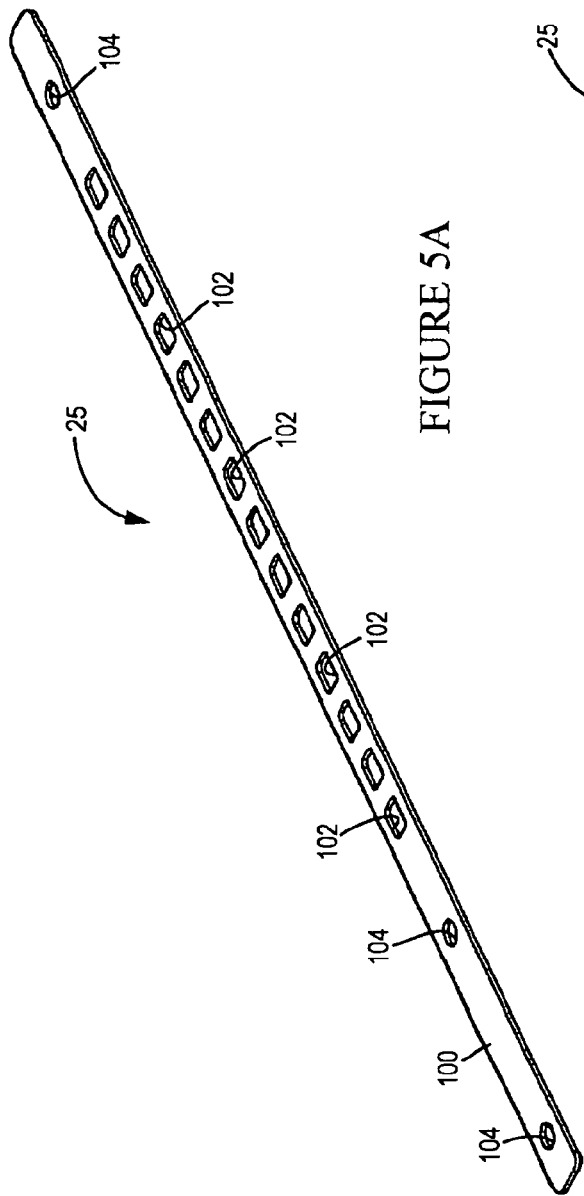
FIGS. 5A through 5C are various views of a reinforcing member according to one exemplary embodiment.
Figure 5B:
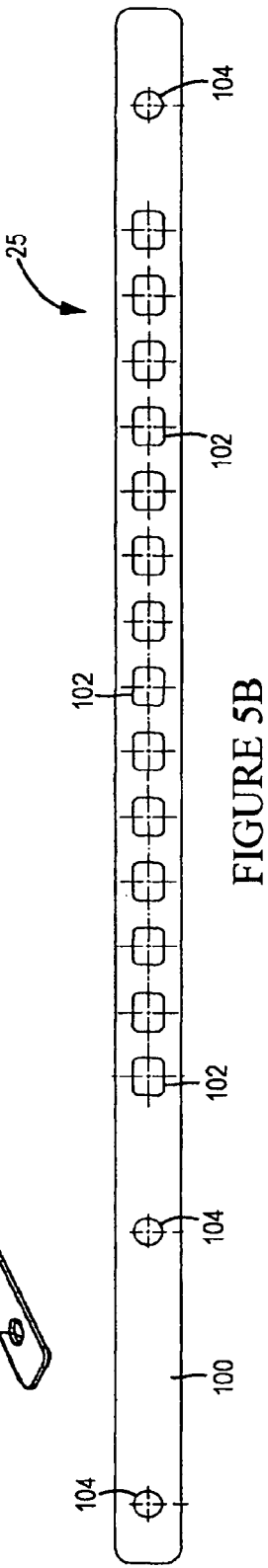
Figure 5C:
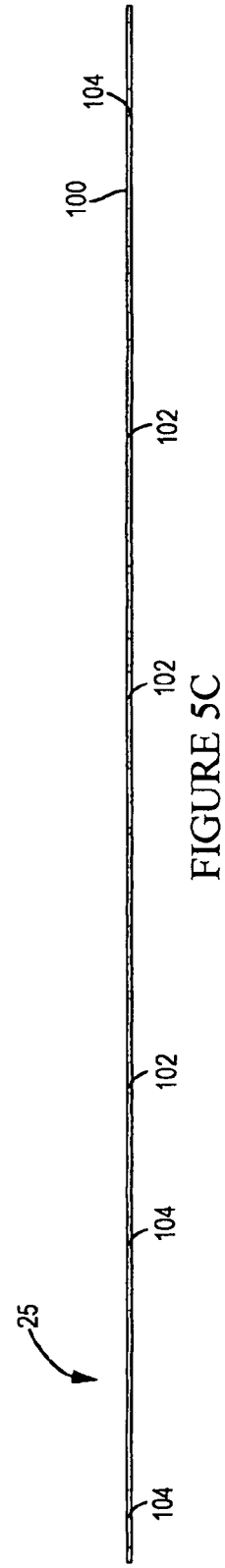
Figure 6:
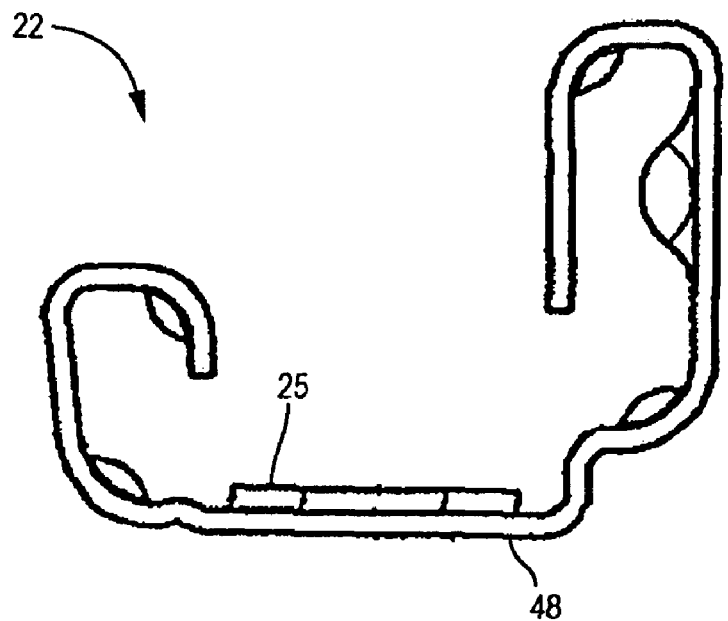
FIG. 6 is a cross-sectional view of the lower track member of FIGS. 3A through 3D shown coupled to a reinforcing member according to one exemplary embodiment.

Referring now to FIGS. 5A through 6, the reinforcing member (e.g., panel, beam, layer, leaf, slab, sheet, etc.), shown as a plate 25, is a generally rigid, elongated, flat member that is configured to be coupled to base 48 of lower track 22 to reinforce and/or strengthen the portions of lower track 22 forming apertures 54. According to one exemplary embodiment, plate 25 includes a body 100, apertures 102, and apertures 104.

Body 100 is a flat, rigid member that is configured to be coupled to base 48 of lower track 22. According to one exemplary embodiment, body 100 has a length, which is equal to the length of lower track 22, a constant width, which is less than the distance of base 48 of lower track 22, and a thickness that is approximately equal to the thickness of lower track 22. Body 100 is configured to be coupled to base 48 such that body 100 lies directly on top of base 48. According to one exemplary embodiment, body 100 is coupled to lower track 22 through the use of laser welding (e.g., laser blank welding, etc.).

Figure 7:
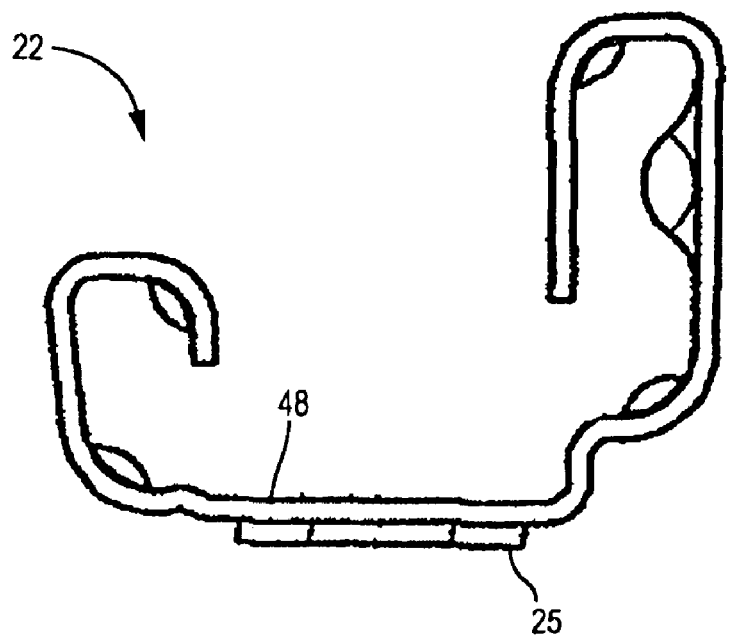
FIG. 7 is a cross-sectional view of the lower track member of FIGS. 3A through 3D shown coupled to a reinforcing member according to another exemplary embodiment.

According to one exemplary embodiment, the thickness of body 100 is equal to or between approximately 0.6 millimeters and approximately 2.5 millimeters. More particularly, the thickness of body 100 is equal to or between approximately 1.5 millimeters and approximately 1.6 millimeters. According to various alternative and exemplary embodiments, the size, shape, and thickness of the body may be varied depending on the characteristics of the material from which the body is constructed (e.g., strength, hardness, weight, etc.), the particular track arrangement in which the plate will be incorporated, the situation in which the track system will be used, the strength required of the track arrangement, weight limitations, and one or more of a variety of other factors. Typically, the strength of the body will be directly related to the thickness of the body, and the weight of the body will be directly related to its thickness. According to other various alternative and exemplary embodiments, the thickness may not be uniform along the length or width of the plate but rather may vary or change. According to still other various alternative and exemplary embodiments, the body may be coupled to the lower track using any one or more of a variety of different structures, fasteners, and/or techniques (e.g., bolts, rivets, other fasteners, adhesives, epoxies, welding, etc.). According to other alternative and exemplary embodiments, the body may have a length sufficient to extend over the entire length of the lower track or only a portion of the length of the lower track, such as the portion of the lower track that includes apertures 54. According to another alternative embodiment illustrated in FIG. 7, the body may be configured to be coupled to base 48 such that body 100 is positioned directly below base 48 of lower track 22.

Apertures 102 are configured to be aligned with apertures 54 of lower track 22 and to cooperate with apertures 54 to releasably receive a portion of latch assembly 28 (e.g., pins 162 of latch 150, described below). Apertures 102 are sized, shaped, and spaced to correspond with apertures 54 in lower track 22. According to one exemplary embodiment, plate 25 is configured to be coupled to the top side of base 48 of lower track 22, and apertures 54 in lower track 22 are made slightly larger than apertures 102. The aperture sizing is intended to avoid a situation where, due to tolerance issues, apertures 102 do not get precisely aligned with apertures 54 and the material forming the edge of an aperture 54 intrudes into the space below an aperture 102 and creates a ledge or protrusion that could interfere with the operation of a pin as it enters apertures 54 and 102. If a pin catches or hangs up on such a ledge, latch assembly 28 may not function properly. According to another exemplary embodiment, plate 25 is configured to be coupled to the bottom side of base 48 of lower track 22, and apertures 102 in plate 25 are made slightly larger than apertures 54. By making the apertures of the bottom member (whether it be plate 25 or base 48 of lower track 22) slightly larger than the apertures of the top member, the possibility of creating a ledge that may interfere with the operation of a pin is reduced. However, it is not necessary that the apertures of the bottom member be made slightly larger than the apertures of the top member. According to another exemplary embodiment, the apertures of the top member (whether it be plate 25 or base 48) may be made slightly larger than, or the same size as, the apertures of the bottom member According to other various alternative and exemplary embodiments, either the top member or the bottom member may serve as the control. To the extent there is a gap between the pin and the bottom member (or the top member) (due to the aperture in the bottom member (top member) being slightly larger then the corresponding aperture in the top member (bottom member)), the gap will be relatively small. Accordingly, in a situation where the pin is forced against the edge of the aperture in the top member (or bottom member) (such as may occur in conditions of heavy acceleration or deceleration) there will only be a short distance the pin can travel (e.g., by deflecting or distorting the top member (or the bottom member)) before it also contacts the bottom member (or top member, as the case may be). Once the pin contacts both the top member and the bottom member, a greater force will be required to cause any further deflection or distortion of the 2-ply structure made up of base 48 and plate 25.

According to various alternative and exemplary embodiments, apertures 102 of plate 25 may take any one of a variety of different shapes, sizes, and configurations depending on the characteristics of apertures 54 in lower track 22, the characteristics of the particular latch assembly with which plate 25 is being used, and one or more of a variety of other factors. According to other various alternative and exemplary embodiments, apertures 102 may be configured in one or more of a variety of different ways relative to apertures 54 in lower track 22.

Apertures 104 are configured to receive one of a variety of different coupling members, fasteners, and/or structures (e.g., pins, studs, rivets, dowels, bolts, etc.) that may be used to couple lower track 22 and plate 25 to the floor of an automobile (or one of a variety of other structures). One example of such a coupling member is a pin or stud (not shown) which extends through aperture 104 and through an aperture 56 in lower track 22 to couple track arrangement 18 to the floor of an automobile. According to various alternative and exemplary embodiments, apertures 104 in plate 25 may vary in number, size, shape, and configuration in order to correspond to similar apertures in lower track 22 and to allow plate 25 and lower track 22 to be coupled to one or more of a variety of different structures using one or more of a variety of different structures.

According to one exemplary embodiment, each of upper track 24, lower track 22, and plate 25 are individually formed from a single piece of ultra high strength steel that is preferably roll-formed and may be stamped and then the individual pieces are integrated into the track assembly. According to an alternative embodiment, the lower track and the plate may be roll formed and apertures 54, 56, 102, and 104 may be punched therein. When formed in this manner, the apertures of the upper member and the lower member may be the same size without creating a ledge on which the pin may catch. According to various alternative and exemplary embodiments, each of the upper track, the lower track, and/or the plate may be constructed from two or more separate pieces of material that are coupled together, such as through the use of welding, fasteners, or other techniques or methods. According to still other alternative and exemplary embodiments, the upper track, the lower track, and the plate may be constructed from one or more of a variety of different materials including various metals, polymers, composites, etc. According to still other various alternative and exemplary embodiments, the plate may be constructed from a different material than the lower track and/or the upper track.

Latch assembly 28 (coupler, latching device, lock, fastener, etc.) is a mechanism or assembly that is intended to cooperate with apertures 54 in lower track 22 and apertures 102 in plate 25 to releasably retain upper track 24 in a fixed positioned relative to lower track 22. According to one exemplary embodiment, latch assembly 28 is configured to be fixedly coupled to the area of sidewall 76 of upper track 24 that extends above the top of inner channel 32 of lower track 22. Coupling latch assembly 28 to the side of upper track 24 helps to minimize the extent to which latch assembly 28 (or any of its components) extends above or below the periphery of lower track 22 and upper track 24, which may facilitate the coupling of track arrangement 18 to a seat, particularly when space is limited.

Referring to FIGS. 8 through 14, latch assembly 28 is shown as a positive engagement latch 150 that includes a support structure 152, a pin 154, an actuating member 156, a resilient member 158, a back plate 160, and pins 162.

Figure 11:
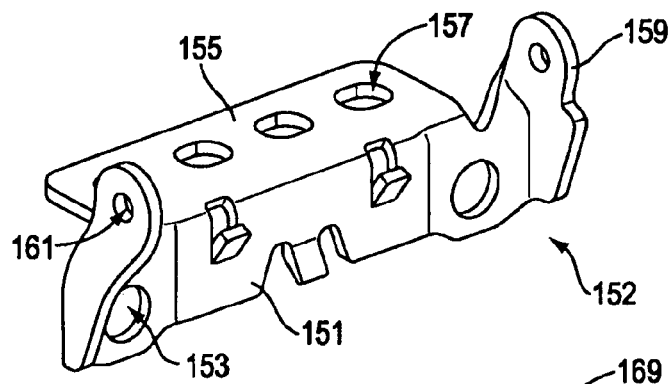
FIG. 11 is a perspective view of a support structure of the latch assembly of FIG. 10 according to an exemplary embodiment.

Support structure 152 (e.g., frame, brace, guide, etc.) is an integrally-formed, rigid member that is coupled to sidewall 76 at a location generally above the top of channel 32 of lower track 22. Support structure 152 serves generally as the base of latch 150 and provides a solid structure to which the other components of latch 150 may be coupled, either directly or indirectly. Referring to FIG. 11, support structure 152 is shown as having a first portion 151 defining a pair of apertures 153 configured to receive a fastener for coupling support structure 152 to sidewall 76. A second portion 155 is shown as being oriented substantially perpendicular to first portion 151. Second portion 155 defines a plurality of apertures 157 configured to receive pins 162. According to an exemplary embodiment, the shape of apertures 157 is substantially the same as the cross-sectional shape of pins 162. Support structure 152 is further shown as having a third portion 159 defining an aperture 161 configured to receive pin 154.

Pin 154 (e.g., pivot, shaft, beam, bar, etc.) is an elongated member that serves to couple actuating member 156 to support structure 152 in a manner that allows actuating member 156 to rotate or pivot relative to support structure 152. Pin 154 extends through corresponding apertures 161 in support structure 152 as well as apertures 165 in actuating member 156 (described below), and provides a pivot point or axis around which actuating member 156 rotates or pivots.

Figure 12:
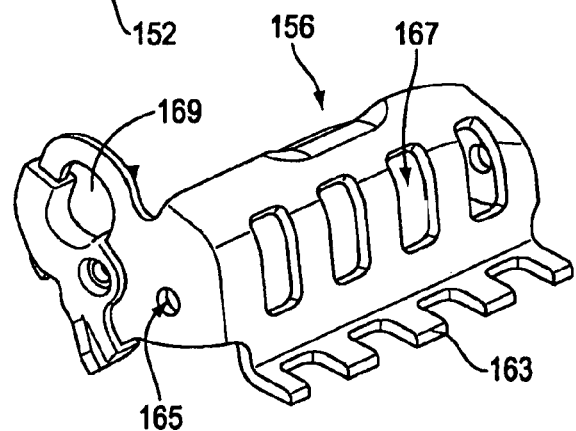
FIG. 12 is a perspective view of an actuating member of the latch assembly of FIG. 10 according to an exemplary embodiment.

Actuating member 156 (e.g., lever, frame, brace, actuator, pin actuator, etc.) is a generally rigid structure that is intended to rotate or pivot around pin 154 relative to support structure 152 upon the application of a force. Referring to FIG. 12, actuating member 156 includes fingers or extensions 163 that extend between each of pins 162 and that engage pins 162 when actuating member 156 is rotated relative to support structure 152. Actuating member 156 is configured to receive and retain a portion of lever assembly 21 through an aperture 169 to actuate lever assembly 21 to actuate actuating member 156 and disengage latch 150. Actuating member 156 is further shown as defining a plurality of apertures 167 configured to receive resilient member 158.

Figure 13:
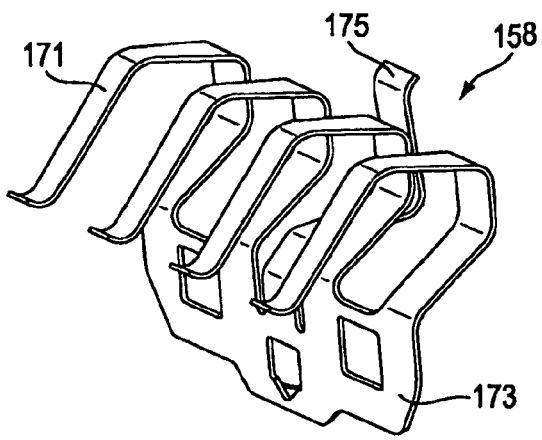
FIG. 13 is a perspective view of a resilient member of the latch assembly of FIG. 10 according to an exemplary embodiment.

Referring to FIG. 13, resilient member 158 (e.g., spring, leaf spring, torsion spring, coil spring, elastic member, etc.) is a resilient structure that biases actuating member 156 and pins 162 toward the position that locks upper track 24 relative to lower track 22 (i.e., toward the engaged position). Resilient member 158 is shown as a one-piece member having a plurality of spring tabs or arms 171. According to the embodiment illustrated, one spring arm 171 is provided for each pin 162. Springs arms 171 are configured to engage an upper surface of pins 162 and are formed so that a downward biasing force is continually applied to pins 162. Resilient member 158 further includes a body portion 173 and an actuating portion 175 that are coupled to support structure 152 and actuating member 156 respectively.

Figure 14:
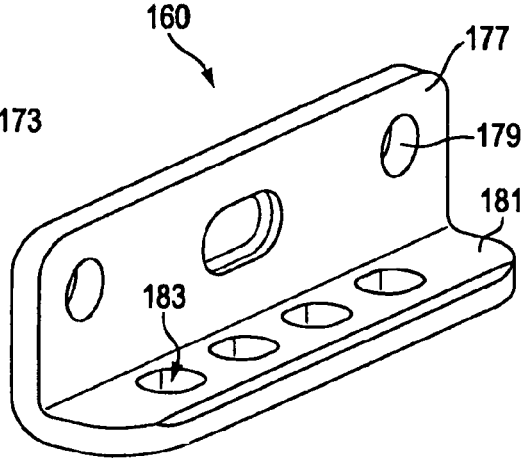
FIG. 14 is a perspective view of a back plate of the latch assembly of FIG. 10 according to an exemplary embodiment.

Referring to FIG. 14, back plate 160 (e.g., frame, guide, brace, etc.) is a generally rigid member that couples to the interior side of sidewall 76 (e.g., the side opposite the side to which support structure 152 is coupled) and that is intended to support and guide pins 162. Back plate 160 is shown as being a substantially L-shaped member having a first portion 177 defining a first series of apertures 179 and a second portion 181 defining a second series of apertures 183. Apertures 179 are configured to receive a fastener for coupling back plate 160 to sidewall 76, while apertures 183 are configured to receive pins 162.

Each of the pins 162 (e.g., bar, shaft, beam, peg, dowel, post, finger, etc.) is an elongated, substantially rigid member that is configured to move into and out of (e.g., engage and disengage) an aperture 54 in lower track 22 and an aperture 102 in plate 25, and to move within an aperture in support structure 152, an aperture 88 in upper track 24, and an aperture in back plate 160, in response to the actuation of actuating member 156.

Referring now to FIG. 1, lever assembly 21 is an assembly of components that is operatively coupled to latch assemblies 28 of inboard track arrangement 18 and outboard track arrangement 20 and that facilitates the ability of the occupant of seat 11 to actuate (e.g., release) latch assemblies 28 to adjust the fore and aft position of seat 11. According to one exemplary embodiment, lever assembly 21 is coupled within track system 16 in such a way that lever assembly 21 engages actuating members 156 of latch assemblies 150 of inboard track arrangement 18 and outboard track arrangement 20. A portion of lever assembly 21 is located generally below the front of seat 11 to allow an occupant of seat 11 to easily reach down, grab a portion of lever assembly 21, and actuate it.

According to one exemplary embodiment, positive engagement latch 150 is configured to move between an engaged position, in which the position of upper track 24 relative to lower track 22 is locked (e.g. the position in which pins 162 engage apertures 54 in lower track 22 and apertures 162 in plate 25), and a disengaged position, in which upper track 24 is moveable or slidable relative to lower track 22 (e.g., the position in which pins 162 do not engage apertures 54 in lower track 22 or apertures 102 in plate 25). Latch 150 is biased toward the engaged position, and remains in the engaged position until an occupant of seat 11 actuates (e.g., directly or indirectly causes the movement of or raises) lever assembly 21. Actuating lever assembly 21 causes latch 150 to move to the disengaged position, which then allows the occupant of seat 11 to move seat 11, in a forward or rearward direction, to a desired position. Once the occupant moves seat 11 to the desired location, the occupant releases lever assembly 21, which in turn allows latch 150 to return to the engaged position (as a result of the bias of latch 150 toward the engaged position) and once again lock the position of upper track 24 relative to lower track 22.

Figure 9:
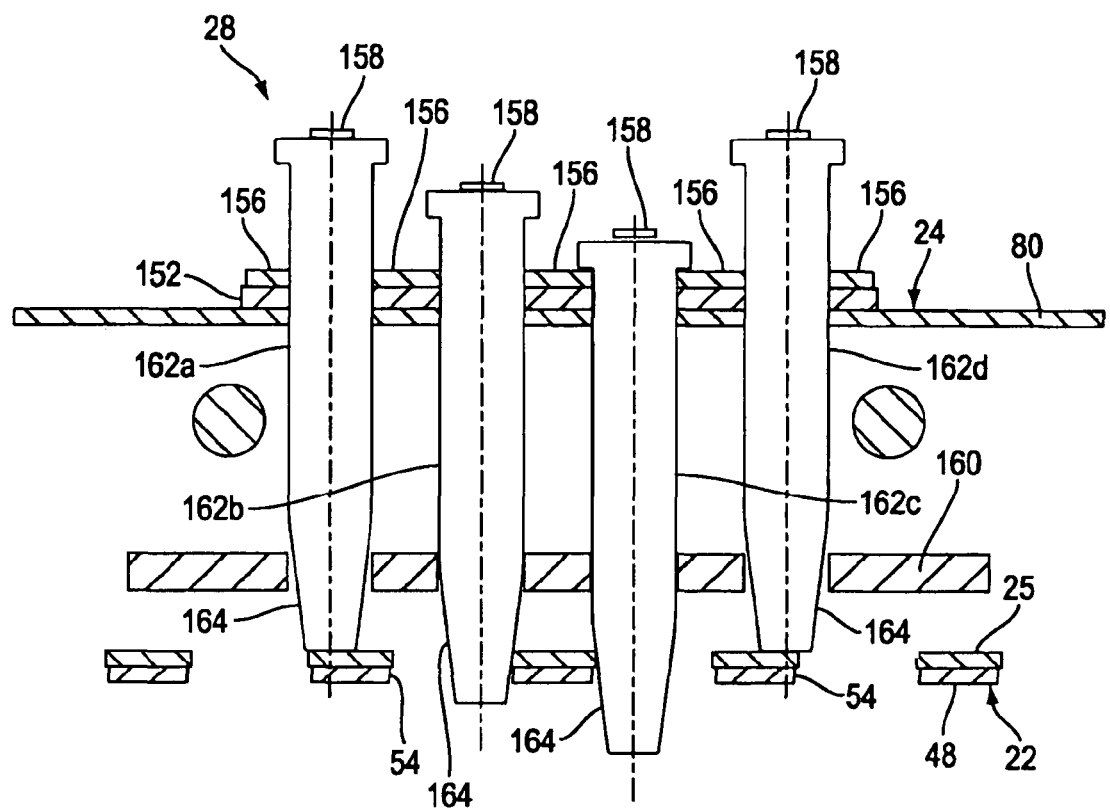
FIG. 9 is a cross-sectional view of a portion of the track arrangement of FIG. 8 taken along lines IX-IX.
Figure 10:
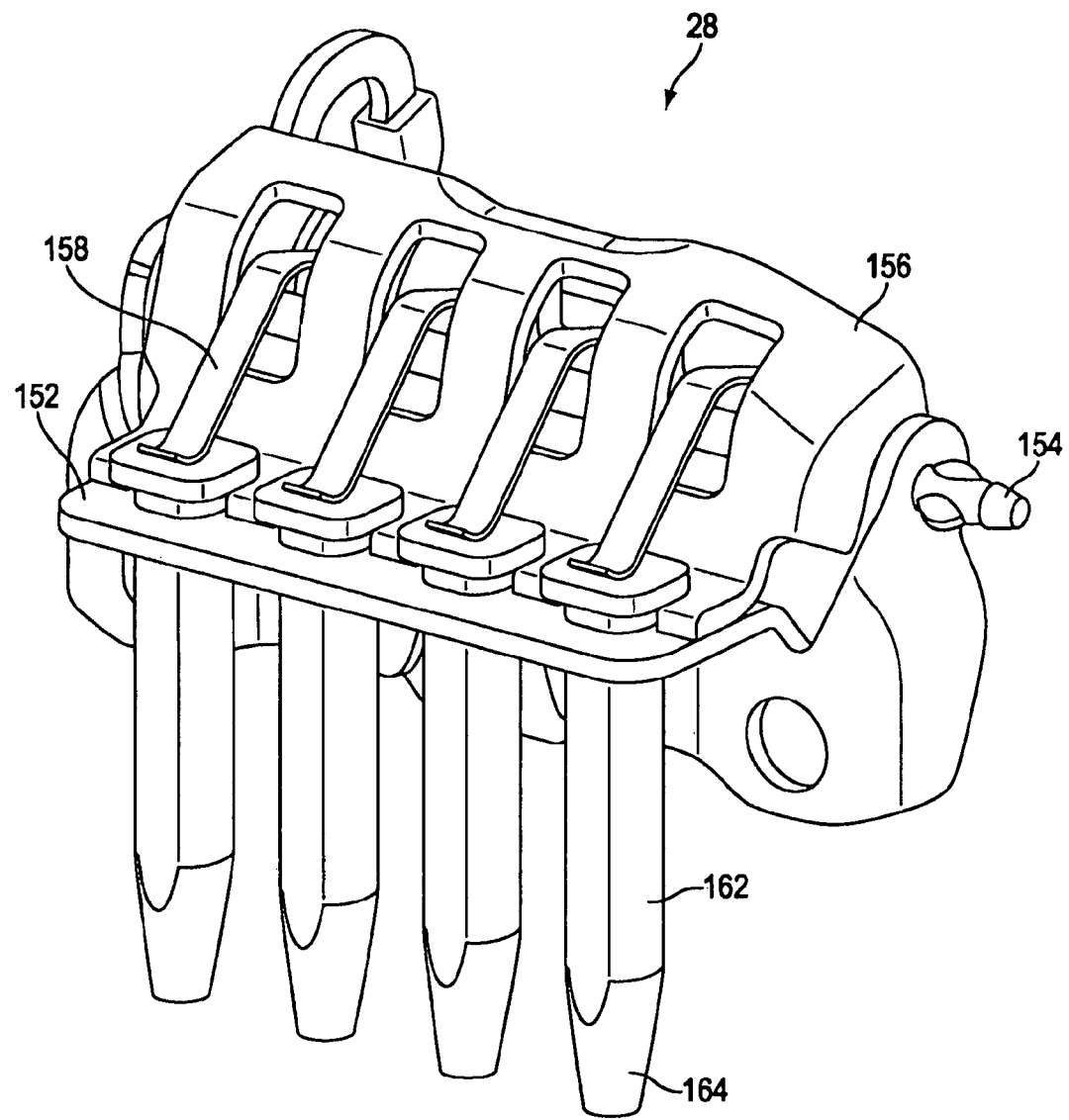
FIG. 10 is a perspective view of a positive engagement latch assembly according to an exemplary embodiment.

According to one exemplary embodiment, the size and spacing of pins 162 do not correspond exactly to the size and spacing of apertures 102 in plate 25 and apertures 54 in lower track 22. Referring to FIG. 9, apertures 102 and 54 are generally wider than is needed to receive a pin 162. Pins 162 are sized and spaced apart such that when latch 150 is in the engaged position, one pin 162 fully engages one pair of corresponding apertures 54 and 102, a second pin 162 partially engages another pair of corresponding apertures 54 and 102, and the other two pins 162 do not engage a pair of corresponding apertures 54 and 102 at all but rather rest against a portion of plate 25 between apertures 102.

With respect to the pin 162 that fully engages an aperture 54, 102 pair, (the primary pin), a tapered end portion 164 of pin 162 extends through the aperture 54, 102 pair until the tapered area 164 of one side of pin 162 (e.g., the fore or aft side) contacts or comes close to contacting the corresponding side or wall (e.g., either fore or aft side) of aperture 102. Due to the taper on the ends of pins 162 and the fact that apertures 54 may be, according to one exemplary embodiment, slightly larger than apertures 102 in order to avoid creating a ledge, end 164 of the pin engaging an aperture 54, 102 pair may not initially contact the edge of the lower aperture, which according to the exemplary embodiment currently being described, is aperture 54.

With respect to the pin 162 that partially engages an aperture 54, 102 pair (the secondary pin), the end portion 164 extends through the aperture 54, 102 pair until one side of the tapered area 164 contacts one side of the aperture 102 at a point approximately half way up the tapered area 164. Accordingly to various embodiments, the point at which tapered area 164 contacts the side of aperture 102 may vary depending on the tolerance stack-up of the various components of latch assembly 150, plate 25, lower track 22, and upper track 24. The sides of the primary pin 162 and the corresponding aperture 102 that contact one another are opposite the sides of the secondary pin 162 and the corresponding aperture 102 that contact one another. Thus, if the front edge of the primary pin 162 contacts the front side of the material forming the corresponding aperture 102, the rear edge of the secondary pin 162 will contact the rear side of the material forming the corresponding aperture 102.

According to one exemplary embodiment, each of pins 162 is configured to deflect and then eventually yield (e.g., reach its yield point) when serving as the primary pin or the secondary pin and when acted upon by a sufficient load. This ability of the primary pin or secondary pin 162 to deflect and yield allows upper track 24 (and possibly other components of latch assembly 150) to move just enough to allow the other of the primary or secondary pin 162 (e.g., the pin serving as the backup pin) to become fully engaged with its corresponding aperture 54, 102 pair.

Upon the application of a sufficient load, the primary or secondary pin 162 serving as the pin initially subjected to the load will start to deflect (which one of the primary pin and the secondary pin is initially subjected to the load will depend on the direction of the load), and then as the load increases, the initially loaded pin 162 will eventually reach its yield point. The deflection and yielding of the initially loaded pin 162 allows the other of the primary or secondary pin 162 (e.g., the backup pin) to move far enough away from the edge of the corresponding aperture 54, 102 pair to become fully engaged. Because the primary pin 162 and the secondary pin 162 initially engage opposite sides of their corresponding apertures 102, no force will be applied to the primary or secondary pin 162 serving as the backup pin until the other of the primary or secondary pin 162 serving as the initially loaded pin deflects enough to allow the backup pin 162 to contact the other side of its corresponding aperture (e.g., the same side of its corresponding aperture 102 that the initially loaded pin 162 engages).

Accordingly, once a certain amount of force or load has been applied to the initially loaded pin 162, the backup pin 162 will become fully engaged with its corresponding aperture 54, 102 pair and will provide additional resistance to any further movement of upper track 24 relative to lower track 22. In this way, the backup pin 162 generally serves as a backup to share the load with the initially loaded pin 162 in the event the initially loaded pin 162 is subjected to unusually high loads, such as may occur during a significant change in vehicle velocity.

According to various exemplary and alternative embodiments, the pins are configured such that they reach their yield points when subjected to a force between approximately 10 kN and approximately 14 kN. According to other various alternative and exemplary embodiments, the pins may be configured so that their yield points occur at any point (e.g., at a point less than 10 kN or greater than 14 kN) that is suitable for the particular application of the track system.

In situations where the aperture in the lower member (i.e., one of plate 25 and lower track 22) is made slightly larger than the aperture in the upper member (i.e., the other one of plate 25 and lower track 22), there may be an area of reduced thickness around the aperture in the upper member (a thickness equal to that of only the upper member, not a thickness equal to that of both the upper member and the lower member). The primary pin 162 may deflect or deform the edge of the aperture in this area of reduced thickness when subjected to such unusually high loads. However, the area of reduced thickness is intended to be small enough that any such deformation or deflection that takes place until the pin contacts both the upper member and the lower member is small enough that it will not significantly affect the intended operation of latch 150.

By contacting different sides of corresponding aperture 54, 102 pairs, the primary pin 162 and the secondary pin 162 generally resist movement of the upper track 24 in either the forward or rearward direction relative to lower track 22. Moreover, the taper on the partially engaged pin 162 allows latch assembly 150 to adjust to the tolerances or manufacturing variances that may arise in the manufacturing of the various components of latch assembly 150, plate 25, upper track 24, and lower track 22 by permitting the partially engaged pin 162 to extend further into, or not as far into, the corresponding aperture 54, 102 pair depending on the tolerance stack up of the various components of latch assembly 150. Essentially, the taper on the partially engaged pin 162 acts as a wedge that pinches a portion of plate 25 (or lower track 22 if plate 25 is coupled to the bottom of lower track 22) between the partially engaged pin 162 and the fully engaged pin 162 and that is able to account for tolerances in the various components of latch 150. This helps to reduce or eliminate any chuck or "play" between lower track 22, plate 25, pins 162, and upper track 24 due to latch assembly 150. Moreover, the angle of tapered areas 164 is intended to be such that pin 162 will not tend to retract from, or pop out of, the aperture 54, 102 pair when acted upon by lower track 22 or plate 25 (or when pin 162 acts upon lower track 22 or plate 25).

According various alternative and exemplary embodiments, the latch assembly may include more or less than four pins, and the pins may be spaced and configured so that all of the pins fully engage a corresponding aperture or pair of apertures in the lower track or plate or so that each of the pins has a different degree of engagement ranging from fully engaged to not engaged at all. According to other various alternative and exemplary embodiments, the pins of the latch assembly may be configured to allow the upper track to be locked in position relative to the lower track at one, two, three, or more incremental positions between the positions that the spacing of apertures 54 and 102 would otherwise allow.

According to various alternative and exemplary embodiments, the latch assembly may be any type of latch assembly, including a positive engagement type latch or a pawl type latch. According to other various alternative and exemplary embodiments, the latch assembly may include one, two, three, five, or more than five pin assemblies (and the upper and lower tracks and the plate may be configured to include a different number of apertures to coordinate with the number of pins of the latch assembly). According to still other various alternative and exemplary embodiments, the shape, size, or configuration of the pins may vary, and the shape, size, or configuration of one pin of the latch assembly may differ from the shape, size, or configuration of a different pin of the same latch. According to still other alternative and exemplary embodiments, the shape, size, and configuration of the various components of the latch assembly may vary depending on the characteristics of the upper track, the lower track, and/or the plate, the environment in which the latch assembly will be used, manufacturing considerations, and one or more of a variety of other factors. According to still other various alternative and exemplary embodiments, a powered apparatus, such as a solenoid, may be used to engage or disengage the latch assembly. According to still other various alternative and exemplary embodiments, the different latch assemblies may be coupled to the track assembly at various locations (e.g., on sidewall 76, intermediate wall 80, sidewall 36, base 48, or other locations) and may be oriented generally horizontally, diagonally, or generally vertically relative to the track assembly or arrangement. According to still other alternative and exemplary embodiments, only one of the two (or potentially more) track arrangements of the track system may include a latch assembly and/or a plate. According to other alternative and exemplary embodiments, the latch assemblies may be provided on the track arrangements so that they are located on the outside of the seat assembly rather than on the inside.

The track assemblies described above provide a relatively simple, durable, solid, and efficient structure for adjusting the position of a vehicle seat in the forward and rearward direction. The track assemblies described above are also easily adaptable to different applications having different strength requirements (e.g. one can easily manufacture multiple strength variants of the same track system and/or the corresponding tooling). By using different plates, a particular track design can be easily adapted to different applications having different strength requirements. The use of a plate to reinforce and strengthen a track helps to keep both the weight and the cost of the track to a minimum. The thickness, material, and other characteristics of the plate can be changed easily, while keeping the design of the tracks the same, to provide the desired reinforcement and/or strength. The use of a plate also tends to reduce engineering and design costs that would otherwise be incurred when trying to adapt an existing track design for use with another application, particularly one that requires the track to withstand greater forces.

It is important to note that the term "seat" is intended to be a broad term and not a term of limitation. According to various alternative and exemplary embodiments, the seat track system or arrangement may be used with any of a variety of seats, assemblies, or arrangements and is not intended to be limited to use with automobile seating, but may be used with any seating where the seat is intended to be adjusted (e.g., selectively arranged between a forward and rear position). For example, the seat may be vehicle seating or any of a variety of seat assemblies used in airplanes, trains, buses, homes, offices, theaters, or anywhere a seated person may wish to adjust his or her seated position. According to various other alternative and exemplary embodiments, the track system may be used with structures other than seats and may be coupled to the floor of a building, dwelling, or other type of structures, or one of a variety of other types of object or structures. According to still other various alternative and exemplary embodiments, the plate may be used with any one or more of a variety of different track types and designs.

It is also important to note that the construction and arrangement of the elements of the track system or arrangement as shown in the exemplary and alternative embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. For example, a variety of configurations may be provided for the upper track, the lower track, and the plate. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary and other alternative embodiments without departing from the spirit of the present inventions as expressed in any appended claims.

What is claimed is:

1. A track assembly for a vehicle seat, the track assembly comprising:
   a first track member having a first portion defining a first set of apertures configured to receive a locking device; and
   a reinforcing member abutting to the first portion and secured thereto, wherein the reinforcing member includes a second set of apertures corresponding to the first set of apertures and configured to receive the locking device, the reinforcing member reinforces the first track member in an area around and between the first set of apertures.

2. The track assembly of claim 1, wherein the first portion is a substantially horizontal portion having an upper surface and a lower surface, the first track member being configured to receive the locking device from the upper surface, the reinforcing member being supported at the upper surface.

3. The track assembly of claim 2, wherein the second set of apertures in the reinforcing member are smaller in size than the corresponding first set of apertures in the first track member.

4. The track assembly of claim 1, wherein the first portion is a substantially horizontal portion having an upper surface and a lower surface, the first track member being configured to receive the locking device from the upper surface, the reinforcing member being supported at the lower surface.

5. A track assembly for a vehicle seat, the track assembly comprising:
   a first track member having a first portion defining a first set of apertures configured to receive a locking device; and
   a reinforcing member abutting to the first portion and secured thereto, wherein the reinforcing member includes a second set of apertures corresponding to the first set of apertures and configured to receive the locking device, the reinforcing member reinforces the first track member in an area around and between the first set of apertures; and
   the second set of apertures in the reinforcing member are larger in size than the corresponding first set of apertures in the first track member.

6. The track assembly of claim 5, wherein the reinforcing member is in the form of a plate.

7. The track assembly of claim 5, wherein the first track member and the reinforcing member are substantially the same length.

8. The track assembly of claim 5, wherein the first portion has a first thickness and the reinforcing member has a second thickness, the first thickness and the second thickness being substantially the same.

9. The track assembly of claim 5, wherein the reinforcing member has a second thickness that remains substantially constant along the length of the reinforcing member.

10. The track assembly of claim 5, further comprising a second track member, the second track member being coupled to and moveable relative to the first track member.

11. The track assembly of claim 10, wherein the first track member is a lower track member and the second track member is an upper track member.

12. The track assembly of claim 10, wherein the locking device comprises at least a first pin and a second pin configured to lock the second track in place relative to the first track by selectively engaging the first set of apertures and the second set of apertures to prevent the movement of the second track relative to the first track.

13. The track assembly of claim 12, wherein the first pin and the second pin are spaced apart so that the first pin substantially engages one of the apertures in the first set of apertures and one of the apertures in the second set of apertures and the second pin partially engages one of the apertures in the first set of apertures and one of the apertures in the second set of apertures when the track assembly is locked.

14. A vehicle seat assembly comprising:
   a seat having a back portion and seat base;
   a track assembly supporting at least the seat base and comprising:
      a first track member defining a first aperture;
      a reinforcing member abutting the first track member and defining a second aperture corresponding to the first aperture and the second aperture is larger in size than the corresponding first aperture in the first track member;
      a second track member coupled to the first track member; and
      a locking device for preventing the movement of one of the first track member and the second track member relative to the other one of the first track member and the second track member, the locking device comprising at least one pin configured to lock the track assembly by selectively engaging the first aperture and the second aperture;
      wherein the reinforcing member reinforces the first track member in an area adjacent to the first aperture.

15. The vehicle seat of claim 14, wherein first aperture comprises a plurality of apertures spaced along a length of the first track member and the second aperture comprises a plurality of corresponding apertures.

16. The vehicle seat of claim 15, wherein the device comprises a first pin, a second pin and a third pin, wherein the first pin, the second pin and the third pin are spaced apart so that the first pin substantially engages one of the first apertures and one of the second apertures, the second pin partially engages one of the first apertures and one of the second apertures, and the third pin rests on top of one of the first portion and the plate when the track assembly is locked.

17. The vehicle seat of claim 16, wherein the devise further comprises a resilient member biasing the first pin, the second pin and the third pin toward a position that locks the track assembly.

18. The vehicle seat of claim 16, wherein the first pin, the second pin and the third pin each comprise a first end and a second end, the second end having a tapered portion configured to engage the first apertures and the second apertures.

19. The vehicle seat of claim 16, wherein the tapered portion of the second pin contacts at least one of the reinforcing member and the first portion when the track assembly is locked.

20. The vehicle seat of claim 16, wherein the device further comprises a fourth pin, wherein the fourth pins rests on top of one of the first portion and the reinforcing member when the track assembly is locked.

21. The vehicle seat of claim 20, wherein the reinforcing member is supported at an upper surface of the first portion and the third pin and the fourth pin rest on top of the reinforcing member when the track assembly is locked.

22. A method of manufacturing a seat track assembly, the method comprising:

providing a first track member having a first portion defining a first set of apertures configured to receive a locking device;

providing a reinforcing member defining a second set of apertures corresponding to the first set of apertures and configured to receive the locking device; and attaching the reinforcing member to the first portion so that the second set of apertures substantially align with the first set of apertures, such that the reinforcing member reinforces the first track member in an area around and between the first set of apertures and the step of attaching the reinforcing member to the first portion includes laser welding the reinforcing member to the first portion.

23. The method of claim 22, wherein the first portion is a substantially horizontal portion of a channel and the step of attaching the reinforcing member to the first portion comprises positioning the reinforcing member at a top surface of the first portion.

24. The method of claim 22, wherein the first portion is a substantially horizontal portion of a channel and the step of attaching the reinforcing member to the first portion comprises positioning the reinforcing member at a bottom surface of the first portion.

* * * * *